US012750417B2

(12) United States Patent
Noack et al.

(10) Patent No.: US 12,750,417 B2
(45) Date of Patent: Sep. 29, 2026

(54) DISTRIBUTED COMPUTER METHOD AND SYSTEM ENABLING APPLICATION OF AUTONOMOUS AGENTS

(71) Applicant: ASSMBL.AI LIMITED, Bury St Edmunds (GB)

(72) Inventors: David Noack, Bury St Edmunds (GB); Humayun Munir Sheikh, Bury St Edmunds (GB); Florian Wilde, Bury St Edmunds (GB)

( * ) Notice: Subject to any disclaimer, the term of this patent is extended or adjusted under 35 U.S.C. 154(b) by 12 days.

(21) Appl. No.: 18/644,761

(22) Filed: Apr. 24, 2024

(65) Prior Publication Data

US 2025/0301038 A1 Sep. 25, 2025

(51) Int. Cl.
*H04L 67/10* (2022.01)
*H04L 69/00* (2022.01)

(52) U.S. Cl.
CPC .............. *H04L 67/10* (2013.01); *H04L 69/03* (2013.01)

(58) Field of Classification Search
CPC ................................ H04L 67/10; H04L 69/03
See application file for complete search history.

(56) References Cited

U.S. PATENT DOCUMENTS

2023/0281491 A1* 9/2023 Hosseini ................ G06N 5/043 706/46
2023/0368284 A1* 11/2023 Sheikh .................. H04L 9/0618
2025/0131359 A1* 4/2025 Barrett .................... G06F 40/35

* cited by examiner

*Primary Examiner* — Umar Cheema
(74) *Attorney, Agent, or Firm* — RC Trademark Company

(57) ABSTRACT

Disclosed is a method and a system that presents a framework for efficient agent communication, focusing on dialogues represented as directed graphs (DGs) to govern message flows. Each dialogue, embodying potential messages and replies, is managed at a session level, allowing multiple concurrent sessions between agent pairs. Invalid message transitions within sessions are gracefully handled with error messages. Initially offering fixed communication patterns, developers fill these patterns with concrete model definitions, customizing communication flows. Explicit decorators link message transitions to models, providing clear guidance. Sessions are asynchronous, supporting resumption post-interruption and enforced timeouts for completion. A dedicated storage system retains session information for context resumption and developer-specific data. The method ensures concurrency, maintaining valid global states amidst limited resource management by the autonomous agents. Interoperability hinges on concrete pattern instantiation, facilitating distinct domain-specific communication. The framework fosters structured, resilient, and customizable agent interactions, advancing efficient AI-driven communication paradigms.

16 Claims, 6 Drawing Sheets

DISTRIBUTED COMPUTER METHOD AND SYSTEM ENABLING APPLICATION OF AUTONOMOUS AGENTS

TECHNICAL FIELD

The present disclosure relates to systems for enabling stateful communication among computing nodes. Moreover, the present disclosure relates to methods for enabling stateful communication among computing nodes.

BACKGROUND

In recent years autonomous agents have gained significant attention as promising technology for addressing complex tasks across various problem domains. The autonomous agents possess the ability to perceive their environment, make decisions, and take actions autonomously, thereby reducing the need for direct human intervention. However, existing systems that employ autonomous agents face several limitations and challenges that hinder their widespread adoption and effectiveness.

Traditional centralized architectures often struggle to handle large-scale deployments of the autonomous agents. As the number of autonomous agents and the complexity of tasks increase, the centralized control and communication become bottlenecks, leading to performance degradation and inefficiencies. Moreover, coordinating the actions of numerous autonomous agents operating in a decentralized manner becomes increasingly difficult, impeding the distributed computer system's ability to effectively solve complex problems.

The current solutions lack the rigidity and structure necessary for robust interactions between services and the autonomous agents. Without a defined structure or sequence of messages, the complexity of potential interactions increases and the coherency between similar agents decreases, making it difficult for an AI Engine to anticipate information flow and make accurate service recommendations. It also creates challenges for developers in implementing robust services as each developer needs to define their message structure on their own. In general, this imposes serious impediments to the growth of a decentralized ecosystem.

Therefore, in light of the foregoing discussion, there exists a need to overcome the aforementioned drawbacks.

SUMMARY

The aim of the present disclosure is to provide a system and a method to reduce complexity and increase robustness in application of autonomous agents. The aim of the present disclosure is achieved by a system and a method for enabling stateful communication among computing nodes as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 1A is an illustration of a block diagram of a system for enabling stateful communication among computing nodes, while

DETAILED DESCRIPTION OF EMBODIMENTS

Figure 1A:
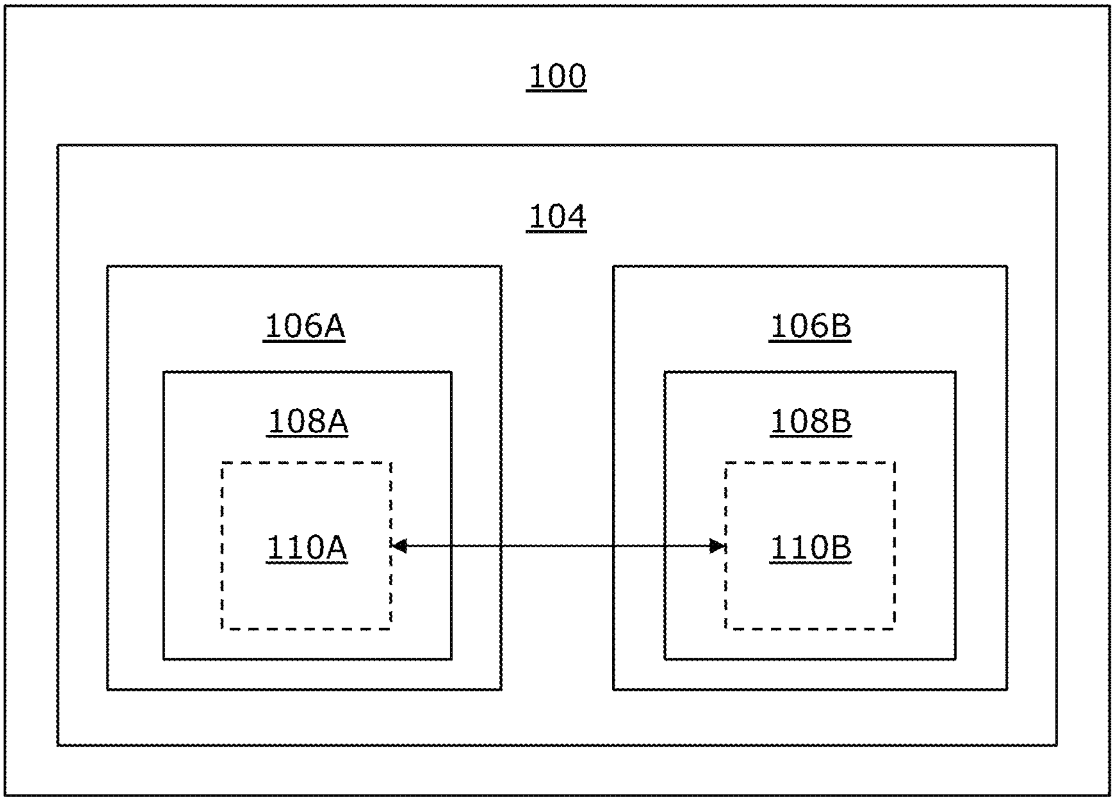

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, the present disclosure provides a system for enabling stateful communication among computing nodes, the system comprising a decentralized computing network configured to implement a software framework, wherein the decentralized computing network comprises a plurality of computing nodes configured to operate as autonomous agents (AAs), which are configured to execute a plurality of modular and extensible software modules, wherein the autonomous agents are communicably coupled with each other, wherein the software framework comprises:

- a communication framework, wherein the communication framework comprises:
  - a pattern generation module configured to generate at least one communication pattern and at least one dialogue model for each autonomous agent; and
  - a pattern instantiation module configured to:
    - receive the at least one communication pattern and the at least one dialogue model, and
    - instantiate one or more communication patterns upon receiving an instantiation prompt;
- a software application executed on a client-agent device configured to generate an objective associated with a service request, and to send the objective to the communication framework, wherein the objective is the instantiation prompt, wherein the pattern instantiation module is configured to instantiate the at least one communication pattern using the at least one dialogue model related to the objective; and
- a protocol generator software module comprising a domain-independent protocol specification language, wherein the protocol generator software module is configured to generate at least one protocol specification for the execution of one or more tasks associated with the objective, wherein the at least one protocol specification is generated using the domain-independent protocol specification language, wherein given autonomous agent is configured to communicate with the computing nodes according to the at least one communication pattern that is instantiated by the at least one dialogue model related to the objective, and to implement the at least one protocol specification to execute each task associated with the objective, such that the service request is executed.

The present disclosure provides an aforementioned system that enable the stateful communication among the computing nodes across diverse domains. The system enhances the functionality of the plurality of autonomous agents, by reducing complexity and increasing coherence in interaction of the autonomous agents. Moreover, the stateful communication among the computing nodes enhances a robustness in the performance of the autonomous agents.

In a second aspect, the present disclosure provides method for enabling stateful communication among computing nodes, the method comprising:

- implementing a software framework, via a decentralized computing network, wherein the decentralized computing network comprises a plurality of computing nodes configured to operate as autonomous agents (AAs), which are configured to execute a plurality of modular and extensible software modules, wherein the autonomous agents are communicably coupled with each other;
- generating at least one communication pattern and at least one dialogue model for each autonomous agent, using a pattern generation module of a communication framework of the software framework;
- receiving the at least one communication pattern and the at least one dialogue model at a pattern instantiation module of the communication framework of the software framework;
- instantiating one or more communication patterns upon receiving an instantiation prompt, using the pattern instantiation module;
- generating an objective associated with a service request, using a software application executed on a client-agent device, and sending the objective from the software application to the communication framework, wherein the objective is the instantiation prompt, for instantiating the at least one communication pattern using the at least one dialogue model related to the objective; and
- generating at least one protocol specification for the execution of on or more tasks associated with the objective, wherein the at least one protocol specification is generated using a domain-independent protocol specification language in the protocol generator software module;
- enabling communication of a given autonomous with the computing nodes according to the at least one communication pattern that is instantiated by the at least one dialogue model related to the objective; and
- implementing the at least one protocol specification for executing each task associated with the objective, such that the service request is executed.

The present disclosure provides an aforementioned method that enable the stateful communication among the computing nodes across diverse domains. The method enhances the functionality of the plurality of autonomous agents, by reducing complexity and increasing coherence in interaction of the autonomous agents. Moreover, the stateful communication among the computing nodes enhances a robustness in the performance of the autonomous agents.

In a third aspect, the present disclosure provides a computer program product comprising a non-transitory machine-readable data storage medium having stored thereon program instructions that, when accessed by a processing device, cause the processing device to implement the method of the first aspect.

The present disclosure provides an aforementioned computer program product that enable the stateful communication among the computing nodes across diverse domains. The computer program product enhances the functionality of the plurality of autonomous agents, by reducing complexity and increasing coherence in interaction of the autonomous agents. Moreover, the stateful communication among the computing nodes enhances a robustness in the performance of the autonomous agents.

Throughout the present disclosure, the term "autonomous agents" refers to computational entities or software programs that are designed to perform tasks or make decisions autonomously, without direct human intervention. The autonomous agents could perceive their environment, analyze information, and take actions based on predefined rules, algorithms, or learning capabilities. Optionally, the autonomous agent is an autonomous economic agent. In this regard, an autonomous micro-agent is optionally a micro autonomous economic agent. Optionally, the autonomous economic agent relates to a software module, or any device comprising at least one software module that is configured to execute one or more tasks. Such tasks may include communication of the autonomous economic agents with each other, processing of information, and so forth. In an example, the autonomous economic agents are configured to employ artificial intelligence (AI) algorithms and machine learning for the execution of the one or more tasks. Notably, all autonomous economic agents are autonomous agents but not all autonomous agents are autonomous agents.

Throughout the present disclosure, the term "stateful communication" refers to a communication style in which the computing nodes configured to operate as the autonomous agents maintain a record of a present state of communication and possible transition states of communication thereof, which allows for a robust and structured interactions of the autonomous agents with another autonomous agent or another node communicably coupled to the autonomous agents.

Notably, the state of communication influences how the autonomous agents interact with the another autonomous agent or the another node communicably coupled to the autonomous agents. Notably, enabling the stateful communication implies performing the tasks or making the decisions autonomously by the computing nodes being operated as the autonomous agents, without the direct human intervention by following the stateful communication. The technical effect of stateful communication is that as the sequence of the messages is known, the unexpected messages received out of sequence are ignored if any which reduces the overhead of the communication and makes the communication more robust.

The system comprises the decentralized computing network that is configured to implement the software framework. Herein, the software framework encompasses any software abstraction which can have one or more software modules to provide generic and/or specific functionality (or specific functionalities). Optionally, the software framework is an agent framework. An agent framework may be a framework that enables the creation of application-specific autonomous agents, an open economic framework employing autonomous agents, or a framework designed for developers (person or by artificial intelligence) to develop applications where both agents and a large language model are included in the application. For example, this may be a framework that is designed to simplify creation of applications using Large Language Models (LLMs). In this regard, the software framework is a specific implementation of the decentralized computing network, designed for the purpose of developing the autonomous agents and for enabling the autonomous agents to interact and transact with each other. The software framework provides the infrastructure and resources for the autonomous agents to communicate, negotiate, and exchange value in a secure and transparent manner. Herein, the open economic framework refers to a computing framework that encompasses a discovery and incorporation of new micro-agents by using the Large Language Model (LLM) and enable the execution of tasks associated with the autonomous agents within the software framework. Notably, the software framework may provide a standard interface for the autonomous agents, and a selection of the autonomous agents to choose from.

Notably, the decentralized computing network comprises the plurality of computing nodes that are communicably coupled to each other, and wherein each of the plurality of computing nodes comprises at least one processor, at least one memory device, and a communication interface. In this regard, when in operation, each of the plurality of computing nodes can perform as either a client device or a service component. Optionally, each of the plurality of computing nodes comprises at least one processor, at least one memory device, and a communication interface. Optionally the computing node is one of: a Large Language Model (LLM), a machine learning (ML) agent, the client-agent device. Furthermore, the decentralized computing network is optionally implemented as a decentralized structured P2P (peer-to-peer) network of devices; alternatively, multi-layer communication networks are employed, wherein communication devices are migrated between the layers depending upon their technical functionality, reliability, peer-review assessment and/or trustworthiness. Specifically, the decentralized structured P2P network represents a decentralized computing environment within a P2P network.

Moreover, the decentralized computing network includes wired and/or wireless communication arrangements (namely "communicating means") comprising a software component, a hardware component, a network adapter component, or a combination thereof. Furthermore, the communication network may be an individual network, or a collection of individual networks, interconnected with each other and functioning as a single large network. Such individual networks may be wired, wireless, or a combination thereof. In an example, the communication network includes Bluetooth®, Internet of things (IoT), Visible Light Communication (VLC), Near Field Communication (NFC), Local Area Networks (LANs), Wide Area Networks (WANs), Metropolitan Area Networks (MANs), Wireless LANs (WLANs), Wireless WANs (WWANs), Wireless MANs (WMANs), the Internet, telecommunication networks, radio networks, and so forth.

Optionally, the software framework includes the plurality of autonomous agents which are communicably interconnected using the decentralized computing network. Optionally, the plurality of autonomous agents serves as a plurality of worker nodes of the decentralized computing network, for collectively fulfilling a plurality of autonomous agents-based functionalities belonging to the plurality of problem domains. The term "autonomous agents-based functionalities" as used herein refers to one or more functionalities of the autonomous agents, that enable the autonomous agents to serve the service request. Such functionalities may be, enabling digital payments, generating product recommendations, resolving customer queries, and the like. In this regard, the autonomous agents use the open economic framework for collectively fulfilling the service requests belonging to the plurality of problem domains. Optionally, the worker nodes include computing arrangements that are operable to respond to, and processes instructions and data therein. The computing arrangements may include, but are not limited to, a microprocessor, a microcontroller, a complex instruction set computing (CISC) microprocessor, a reduced instruction set (RISC) microprocessor, a very long instruction word (VLIW) microprocessor, an artificial intelligence (AI) computing engine based on hierarchical networks of variable-state machines, or any other type of processing circuit. Furthermore, the computing arrangements can be one or more individual processors, processing devices and various elements associated with a processing device that may be shared by other processing devices. Additionally, the computing arrangements are arranged in various architectures for responding to and processing the instructions that drive the system.

The computing arrangements are processing devices that operate automatically. In such regard, the computing arrangements may be equipped with artificial intelligence algorithms that are configured to respond to and to perform the instructions that drive the system based on data learning techniques. The computing arrangements devices are capable of automatically responding and of performing instructions based on input provided by the one or more users (namely, the worker nodes participating in the system). The worker nodes further include local databases to store data therein. Furthermore, the collective learning of the worker nodes is managed within the system. Notably, the computing model is trained between the plurality of worker nodes in a manner that the intermediary computing models that have been partially trained are shared between the worker nodes and resources of worker nodes are utilized productively.

Moreover, the plurality of worker nodes is communicably coupled to each other via the decentralized computing network. For example, the software framework is configured to allow access to the autonomous agents to operate within the software framework based on a set of rules and/or security protocols. Similarly, the software framework may deny access to the autonomous agents to operate within the software framework upon determining that the autonomous agents do not comply with the set of rules and/or security protocols. In one example, the software framework is implemented by the autonomous agents that are configured to enable communication between other autonomous agents within the software framework, process information associated with an interaction between other autonomous agents within the software framework, provide (or deny) access to the autonomous agents to the software framework and so forth. Moreover, the software framework enables to provide a decentralized economic market for enabling various services to be provided and/or procured by autonomous agents. Such a decentralized economic market may be representative of a real-world environment, such as a real-world market where one or more services are provided and/or procured by the autonomous agents.

Moreover, optionally, a distributed ledger arrangement is consensually shared and synchronized in a decentralized form across the plurality of worker nodes. The distributed ledger arrangement refers to a database of entries or blocks of data.

In an example embodiment, the service requests provided by the autonomous agents is a collective bid provided by multiple autonomous agents, wherein the multiple autonomous agents collectively provide the service to the plurality of computing nodes. It will be appreciated that a given autonomous agent may only be capable to execute a portion of the service request that is generated by the plurality of computing devices. The service request may include a plurality of steps. The term "collective bid" as used herein refers to a bid that is generated and communicated by the given autonomous agent to the plurality of computing nodes, wherein the given autonomous agent acts on behalf of multiple autonomous agents, and wherein the multiple autonomous agents collectively provide the service to the plurality of computing nodes. In such an instance, the given autonomous agent may simultaneously be a client autonomous agent, namely a secondary client autonomous agent, that may be acquiring services from one or more other autonomous agents, namely a second plurality of autonomous agents for the execution of the remaining portion of the service.

Optionally, at least one service bid (offer made by a service provider) of the plurality of service bids is a collaborative service bid associated with two or more autonomous agents. In an example, the service bid for the aforesaid service request for transporting the user from Birmingham to Amsterdam may include at least two service providers such as travel agents. In such example, one service provider may be from Birmingham and the other service provider may be from Amsterdam. In such example, the service provider from Birmingham may provide service based on the rules and norms of the United Kingdom and the service provider from Amsterdam may provide service based on the rules and norms of the Netherlands. Therefore, the service bid generated by the service providers may include the rules and norms of United Kingdom and Netherlands. In such instance the autonomous agents associated with the service components of the service provider from Birmingham may communicate with the autonomous agents of the service components of the service provider from Amsterdam. Furthermore, the autonomous agents are operable to determine the travel route of the user that is safe, fast, and cost-effective. Optionally, the service provider may collaborate with another service provider including the service component to complete the service request such as the request for surveying the area using a drone having specific sensors generated by the user.

The plurality of computing nodes are configured to operate as the autonomous agents (AAs), which are configured to execute the plurality of modular and extensible software modules meaning that the autonomous agents are modular and extensible, thus the autonomous agents are self-sufficient entities executed by the plurality of computing nodes that could function independently and could be reused and adapted or modified as needed to fit various use cases/circumstances based on their own rules and objectives. The autonomous agents are modular, meaning that they are composed of separate parts or units that can be combined together in various manners to achieve a variety of functionalities. The autonomous agents are extensible, meaning that their existing functionalities are capable of being extended further by addition of newer modular parts or units. It will be appreciated that when multiple autonomous agents work collectively for an application (i.e., use case), different steps of the application are completed by different autonomous agents. The multiple autonomous agents work in consensus to collectively reach a final outcome for achieving a required functionality of said application. Additionally, the autonomous agents could be modulated to perform new tasks, respond to changing market conditions, or interact with new environment without disrupting the overall functioning thereof or the system it operates within. The reusability and compositions of the autonomous agents reduce the use of computation resources required to fulfil the service request. Moreover, the reusability makes the development and expansion of the system's functionality time-efficient since it reduces or removes the need for re-programming the autonomous agents. Furthermore, the composition and reusability of autonomous agents or composed autonomous agents provides a way to handle any complex action by using existing protocols without the need to start from scratch thus reducing the use of computational resources. Also, the ability to expand and adapt makes autonomous agents more versatile and sustainable, thereby making the autonomous agents future proof. Herein, the plurality of problem domains may include, but is not limited to, energy, finance, supply chain, governance, manufacturing, mobility, smart cities, and internet of things (IoT) applications.

Optionally, the autonomous agents are combined with human-readable text input to create a scalable AI infrastructure that supports Large Language Models (LLMs), which is referred to as an AI engine. It is an essential component of an AI-based chat interface and its functionalities. The goal of the AI engine is to analyze, understand and link human input to the autonomous agents by facilitating natural language interactions. The AI engine reads the user input, converts it into actionable tasks and selects the most appropriate autonomous agent to perform the task. Optionally, the AI-based chat interface serves as a front-end gateway to the AI Engine. It offers users a straightforward chat interface through which they can input the service requests. The service requests are then translated by the AI Engine into a series of tasks to be executed.

Herein, the term smart contract refers to a contract that provides the users with a direct way to query a particular autonomous agent's information, as well as allowing other autonomous agents to retrieve information about any specific autonomous agents registered within the smart contract.

Throughout the present disclosure, the term "communication framework" refers to is a framework that enables any communication happening between at least one of: the two or more autonomous agents, the one or more autonomous agents and the one or more nodes communicably coupled with the autonomous agents to be the stateful communication. Notably, the communication framework includes software modules that ensure that a set of rules and regulations required for enabling the stateful communication are being complied with. In some implementations, the communication framework is configured to enable the stateful communication between the two or more autonomous agents. In other implementations, the communication framework is configured to enable the stateful communication between the one or more autonomous agents and the one or more nodes communicably coupled with the autonomous agents. In yet other implementations, the communication framework is configured to enable the stateful communication between the two or more autonomous agents, and between the one or more autonomous agents and the one or more nodes communicably coupled with the autonomous agents. Throughout the present disclosure, the term "node" refers to any processing device or module that is communicably coupled to the autonomous agents. It will be appreciated that the "one or more nodes" refers to a "single node" in some implementations, and a "plurality of nodes" in other implementations. Optionally, the one or more nodes are at least one of: one or more Large Language Models (LLMs), one or more Machine Learning (ML) agents, one or more client agent devices.

Throughout the present disclosure, the term "pattern generation module" refers to a software module that generates the at least one communication pattern and the at least one dialogue model for each autonomous agent. Notably, the pattern generation module comprises a set of protocols and algorithms that are required to generate the at least one communication pattern and the at least one dialogue model for each autonomous agent. Throughout the present disclosure, the term "communication pattern" refers to a well-structured model that defines a manner in which each autonomous agent communicates while executing the one or more tasks for which said autonomous agent is configured. Notably, the at least one communication pattern acts as a blank flow of communication that is to be followed in communication of said autonomous agent with another autonomous agent and/or any node coupled to said autonomous agent. It will be appreciated that the at least one communication pattern sets out guidelines and boundaries for any communication of said autonomous agent.

Optionally, each of the at least one communication pattern for each autonomous agent amongst the autonomous agents comprises a set of generic states and possible state transitions, wherein each generic state amongst the set of generic states and each possible state transition amongst the possible state transitions have a name and a description.

In this regard, the term "generic states" refers to different states of communication that may occur in communication of said autonomous agent based on the one or more tasks for which said autonomous agent is configured. Throughout the present disclosure, the term "possible state transitions" refers to one or more generic states in which the communication can transition into from a given generic state. Throughout the present disclosure, the term "name" refers to a unique identifier for each generic state amongst the set of generic states and each possible state transition amongst the possible state transitions. Throughout the present disclosure, the term "description" refers to details and information regarding each generic state amongst the set of generic states and each possible state transition amongst the possible state transitions. A technical effect is that the at least one communication pattern has a well-defined structure which enables to reduce the complexities in the communication of each autonomous agent, while executing the one or more tasks for which said autonomous agent is configured. The well-defined structure for the communication of each autonomous agent enabled by the at least one communication pattern further reduces the overhead in the communication between the autonomous agents and/or any node coupled with the autonomous agents.

Throughout the present disclosure, the term "dialogue model" refers to a set of messages to be used in the communication of said autonomous agent, based on a context in which said autonomous agent is to be used. It will be appreciated that the "at least one dialogue model" refers to a "one dialogue model" in some implementations, and a "plurality of dialogue models" in other implementations. Notably, each dialogue model amongst the at least one dialogue model is generated for a different context for which said autonomous agent is to be employed. Optionally, each dialogue model has an entry message and a set of replies where a reply may be empty for a given message in said dialogue model. Optionally, the at least one dialogue model comprises state transition decorators that attach specific functionalities to the at least one dialogue model and enforce consistency in state transitions in the at least one dialogue model. Optionally, the state transition decorators are realized using either a generic way (that requires to parameterize the state transition decorator accurately) or a prescriptive way (that requires a predefined unique state transition decorator for each message in the at least one dialogue).

Optionally, the at least one dialogue model is represented as a directed graph (DG), wherein vertices of the directed graph represent possible messages in the at least one dialogue model and edges of the directed graph represent possible replies to a given possible message amongst the possible messages. In this regard, the term "directed graph" refers to a type of graph in which the edges of the directed graph have direction that indicates a one-way relation between the vertices of the directed graph. Notably the vertices of the directed graph representing possible messages in the at least one dialogue model and edges of the directed graph representing possible replies to a given possible message amongst the possible messages implies that the directed graph represents a one-way relation of which other possible messages amongst the possible messages may act as possible replies to the given possible message amongst the possible messages. Optionally, a new communication session between any two autonomous agents is started with a possible message present in a vertex of a first layer in the directed graph. Optionally, multiple different arbitrary communication sessions of the same dialogue model may happen parallelly between same two autonomous agents. Optionally, in the communication session any messages that are not valid possible replies according to the edges of the directed graph are rejected and replied with an appropriate error message. Optionally, the edges are linked to the at least one dialogue model using explicit decorators. A technical effect is that the at least one dialogue pattern has a well-defined structure which enables to reduce the complexities in the communication of each autonomous agent, while executing the one or more tasks for which said autonomous agent is configured.

Throughout the present disclosure, the term "pattern instantiation module" refers to that software module comprising a set of protocols and algorithms required to instantiate the one or more communication patterns upon receiving the instantiation prompt. Notably, the pattern instantiation module is communicably coupled to the pattern generation module to receive the at least one communication pattern and the at least one dialogue model for each autonomous agent, from the pattern generation module. Herein, instantiating the one or more communication patterns relates using the set of messages in the one or more dialogue models for completing the blank flow of communication in the one or more communication patterns to enable the one or more autonomous agents to communicate using the stateful communication. Notably, the one or more communication patters are instantiated using the one or more dialogue models based on the different contexts for which the one or more dialogue models are generated. Optionally, a given communication patterns is instantiated using a given dialogue model based on at least one of: a name, a version, rules, agent address, timeout, maximum number of messages of the given dialogue model. Throughout the present disclosure, the term "instantiation prompt" refers to a prompt which indicates that the one or more autonomous agents are being used to execute the one or more tasks for which the one or more autonomous agents are configured, and thus, the one or more communication patterns are to be instantiated by the pattern instantiation module.

In an implementation, the at least one communication pattern is at least one abstract communication pattern that can be instantiated using different dialogue models to allow for greater flexibility across different service domains while ensuring a rigid structure of communication that maintains robustness in the functioning of the autonomous agents. The at least one abstract communication pattern describes a general flow of communication and a sequence of messages, as well as a general meaning of each message and possible communication paths.

Advantageously, a complexity of potential interactions between the autonomous agents for executing the objective associated with the service request is reduced. Moreover, the autonomous agents are provided support in understanding and anticipating information flow in the communication, and thus, make better service recommendations.

For example, an abstract communication pattern can be as followed:

1. A sends a request with the preferred conditions,
2. B replies with available resources and conditions
3. A and B negotiate to find the best match (or abort if there is no match)
4. A and B settle a payment commitment.

In this regard, the abstract communication pattern is suitable to be used in a scenario when the service request is to order a pizza and, in another scenario when the service request is to book a barber appointment. However, for ordering the pizza, sorting through all the barber agents is not required, whereas details in negotiation such as ‘extra pineapples’ are not required in booking the barber appointment. Thus, the abstract communication pattern is instantiated using different dialogue models for ordering the pizza, and booking the barber appointment, respectively.

Herein, the client-agent device is communicably coupled with the agent-device that enables operation of the client-agent device within complex environments. It will be appreciated that the agent-device possesses an ability to incorporate external resources and collaborate with other agent-devices to perform tasks that would be difficult for the client-agent device to accomplish alone. Optionally, agent-device promotes secure co-learning of the client-agent device. In an example, the client-agent device includes a portable communication device. For example, the client-agent device is at least one of a smartphone, a laptop computer or a tablet computer or a software module in the user device. Optionally, the client-agent device could be an interface between the agent-device and an agent marketplace, enabling autonomous participation and decision-making within the ecosystem. Herein, the agent-device refers to a computing device or software module that operates as an autonomous agent within the system.

It will be appreciated that by providing the client-agent device as part of the software framework, the system enables users to interact with the plurality of autonomous agents and utilize the capabilities of the software framework to accomplish various tasks and objectives. Throughout the present disclosure, the term “software application” refers to a modular and extensible software module that functions as an application programming interface (API). Typically, the application programming interface (API) is a set of rules and protocols that allows different software applications to communicate and interact with each other. Optionally, the software application within the client-agent device could be a chatbot that interacts with users through natural language processing. Optionally, the software application could be a task management application that allows users to create, assign, and track tasks. Optionally, the software application could function as a virtual assistant application that assists users with various tasks and provides personalized recommendations or services. Optionally, the software application could serve as an intelligent shopping assistant, and so forth.

Throughout the present disclosure, the term “service request” as used herein refers to a specific action or communication made by a user, typically through a digitalized system, to seek a particular service or assistance. Optionally, the service request can take various forms, such as direct interactions with digital interfaces like voice assistants (such as Siri, Alexa, ChatGPT, and so forth), inputting information into dedicated applications, or entering appointments into personal calendars. Optionally, the service request may include metadata, which is additional information accompanying the request, and is utilized by the Large Language Model (LLM) to provide relevant inferences or responses. Optionally, the service request may originate from individuals or authorized entities, including the digital twins or company Large Language Models (LLMs) empowered to request services on behalf of the clients, such as arranging travel services.

In an embodiment, the service request includes at least one of: a time needed for providing the service, a price associated with the service, a quality associated with the service, and/or at least one preference associated with the service. For example, the user specifies a parameter (such as, using the graphical user interface associated with client-agent device) including at least one of: time, price, quality and/or at least one preference that is required by the user in the provided service. In such an instance, the parameter is provided to the client-agent device with the generated service request. In one example, the service request includes the price associated with the service, such as a minimum and maximum price associated with the service.

Optionally, the service request is received from at least one of: a software application executing on a device of a user, a software application executing on a computing device that is communicably coupled to a device of a user, a cloud-based software application, a digital twin of a user, a digital representation of a user, an artificial intelligence model (AI-model) based on a Large Language Model (LLM). In this regard, the service request can be received from the software application such as a mobile application or a desktop application installed or executed on the user’s device. For example, a user using a travel planning application on their smartphone can make a service request to book a hotel. Optionally, the service request can be received from a software application executing on the computing device such as a home automation hub that is communicably coupled to the user’s device (such as a smartphone) through a wireless connection. In such a case, the user utilizes the software application on their smartphone to interact with and send service requests to the home automation hub, enabling the user to control and manage various aspects of a smart home environment. Optionally, the service request is received from the cloud-based software application such as Google Calendar.

Optionally, the service request can be received from the digital twin that refers to a virtual representation of a given user. It will be appreciated that a given digital twin is updated in real-life, from real-time data. Optionally, the given digital twin employs simulation, machine learning and reasoning to assist in decision-making. Typically, the given digital twin spans a lifetime of the given user, however, a lifetime of the given digital twin may vary based on requirements of the given user. Optionally, the given digital twin being the autonomous agent means that the given digital twin is capable of autonomously making decisions on behalf of the given user. Optionally, the digital twin could be a party sending the service request.

Optionally, the service request can be received from the digital representation of the user that refers to a computer-generated representation of the user. For example, the digital representation could be a chatbot or an avatar that interacts with the system on the user's behalf. For instance, a user's digital representation engaging in a virtual meeting and making a request for a presentation to be shared. Optionally, the service request can be received from the artificial intelligence model (AI-model) based on the Large Language Model (LLM) to generate natural language responses or carry out tasks. For example, a user interacting with a language-based AI assistant like ChatGPT to request information about nearby restaurants. Beneficially, the system can receive the service requests from diverse sources, including various software applications, cloud-based services, digital twins, digital representations, and AI models. This broadens the accessibility and flexibility of the system, allowing users to interact with the system through different channels or interfaces. Optionally, in task refinement the machine learning model agent such as the Large Language Model may be used to break down a given task into its sub-tasks or may provide alternatives or variants of doing the given task. The user may also provide the input for selection of a given alternative or variant amongst the alternatives or variants provided.

Throughout the present disclosure, the term "objective" refers to a desired outcome or goal that the client-agent device aims to achieve based on the service request received therethrough. Optionally, the objective defines the purpose or intent behind the service request. In this regard, the objective is generated by the software application executed on the client-agent device. The objective is typically formulated in a structured manner to provide clarity and guidance for the subsequent actions of the client-agent device and the autonomous agents in the system. For example, the objective could be to book a flight to Paris, when the service request is to find and book a flight to Paris. In another example, the objective could be to schedule a meeting with an individual on a specific day. In yet another example, the objective could be to order groceries and deliver them by a specified date.

Optionally, when generating the objective associated with the service request, the software application executed on the client-agent device is configured to:

- send the service request to a Large Language Model (LLM) for processing, wherein the Large Language Model (LLM) is configured to transform the service request into a service data associated with the service request, the service data being in a form of one or more vectors recorded in a vector database,
- receive the service data from the Large Language Model (LLM), and
- use the service data received from the Large Language Model (LLM) as the objective.

In this regard, the software application utilizes the Large Language Model (LLM) to process the service request. Notably, the Large Language Model is an artificial intelligence model trained on a vast amount of textual data, enabling it to understand and generate human-like language responses. Moreover, when the software application refers the service request to the Large Language Model, it uses natural language processing techniques to analyse and interpret the service request. The Large Language Model understands the context, identifies key information, and extracts relevant details from the service request. Moreover, once the Large Language Model processes the service request, it transforms the extracted information into service data represented as the one or more vectors. The one or more vectors capture the essential characteristics or attributes of the service request in a structured format. For example, if the service request is to find a nearby restaurant, the Large Language Model can extract information such as the desired cuisine, location, price range, and any specific dietary restrictions. This information is then converted into a vector representation with each dimension representing a specific attribute (such as cuisine, location, price, and so forth).

Furthermore, the service data, in the form of one or more vectors, generated by the Large Language Model is used as the objective associated with the service request. It becomes the refined and structured representation of the user's request, suitable for further processing within the system. For instance, the transformed service data vector may be used by other autonomous agents in the system to match the user's preferences with available restaurants, recommend suitable options, or make decisions based on the extracted attributes. The technical effect of sending the service request to the Large Language Model (LLM) is that it allows for efficient storage, retrieval, and manipulation of the objective within the system, enhancing the system's ability to understand and fulfil the user requests accurately and effectively. Further, the service request received from the user is in an unstructured data format which is converted to a structured and meaningful data using the language model module.

Notably, the software application is communicably coupled to the communication framework to send the objective to the communication framework. Herein, the objective serving as the instantiation prompt implies that the given autonomous agent associated with the objective are to be used for the execution of the objective, and thus, the at least one communication pattern for the at least one objective needs to be instantiated to enable stateful communication for the at least one autonomous agent while executing the objective.

Optionally, the protocol generator is configured to receive a list indicative of at least one autonomous agent associated with the objective from the communication framework, wherein the at least one autonomous agent associated with the objective is identified using a broadcast message, wherein the broadcast message comprises a pattern digest broadcasted to the decentralized computing network by the software application and the at least one autonomous agent associated with the objective in the decentralized computing network is identified using the pattern digest. In this regard, the term "at least one autonomous agent associated with the objective" refers to those one or more autonomous agents whose functionalities and capabilities are suitable to execute the objective. Throughout the present disclosure, the term "broadcast message" refers to a message comprising the pattern digest that is broadcasted simultaneously to the autonomous agents present in the decentralized computing network, by the software application. It will be appreciated that the message is sent to a protocol over which the autonomous agents in the decentralized computing network are registered. Subsequently, instead of needing go through an explorer to contact the autonomous agents, the protocol queries the autonomous agents registered over it, resolve addresses of the autonomous agents and send the broadcast message to each of the autonomous agents. As a result, every newly registered autonomous agent is automatically sent the broadcast message without the need for any change in the broadcast message. Thus, a scalability of sending the broadcast message is significantly enhanced. Notably, the broadcast message being broadcasted to the autonomous agents enables each autonomous agent to simultaneously check the pattern digest present in the broadcast message to determine whether said autonomous agent is associated with the objective. Throughout the present disclosure, the term "pattern digest" refers to an identifier that indicates the at least one communication pattern is required for interaction while executing the objective. It will be appreciated that by checking the pattern digest, each autonomous agent determines whether the at least one communication pattern indicated in the pattern digest matches with the at least one communication pattern of said autonomous agent or not. Subsequently, each of said autonomous agent whose communication pattern matches with the type of communication pattern indicated in the pattern digest is identified as the at least one autonomous agent associated with the objective. A technical effect of using the broadcast message comprising the pattern digest to identify the at least one autonomous agent is that the at least one agent is effectively and accurately identified with less computational resources. In this context, the at least one autonomous agent associated with the objective refer to the autonomous agents that are working in the same type of the at least one communication pattern. Other autonomous agents which are not associated with the at least one communication pattern are automatically blocked from the communication to enhance system performance. The proposed method of using the at least one communication pattern and the pattern digest to identify the at least one autonomous agent associated with the objective significantly improves the operational time and reduces the storage and resource requirements because there is no need for the system to have a database of agents with their functionality recorded in the database and search the database to identify the associated autonomous agents.

Optionally, the pattern digest is a cryptographic hash of a type of the at least one communication pattern to be employed for the objective associated with the service request. In this regard, the term "type of the at least one communication pattern" as used herein refers to a category to which the at least one communication pattern to be employed for the objective belongs to. Throughout the present disclosure, the term "cryptographic hash" refers to an encrypted representation of the type of the at least one communication to be employed for the objective, in form of a hash code (i.e., a hexadecimal number). A technical effect of the pattern digest being the cryptographic hash is that data security is ensured in the system as the pattern digest can be accessed by the autonomous agents only after proper authentication.

Optionally, the given autonomous agent comprises a context-builder software module configured to, upon receiving the objective, send one or more queries to the Large Language Model (LLM) to retrieve one or more tasks associated with the objective of the service request. In this regard, the term "context-builder software module" as used herein refers to a component of the given autonomous agent within the system. It is responsible for building the context necessary to execute tasks associated with the objective. In this regard, upon receiving the objective, the context-builder software module sends one or more queries to the machine learning model agent Large Language Model. Optionally, the context-builder software module is communicably coupled with a platform which enables creation, testing, development, deployment and management of autonomous agents. Optionally, the platform is also communicably coupled to the vector database. Optionally, the platform could be an agentverse which is a tool that serves as a portal to the broader agent-based software frameworks and toolsets. Optionally, the platform provides a library of pre-built agents, an analytics dashboard, and an intuitive interface, making it a powerful platform for creating intelligent software autonomous agents. The context-builder software module is configured to access the vector database, which contains one or more vectors recorded in it. The context-builder software module retrieves tasks associated with the previous queries from the vector database to obtain the one or more associated with the objective. Optionally, by accessing the vector database, the context-builder software module gathers relevant information and tasks that are similar or related to the current objective. For example, when the objective is to plan a vacation, and there are multiple tasks involved, such as booking flights, reserving accommodation, and arranging transportation. In such a case, the context-builder software module communicates with the LLM to obtain insights and recommendations on the optimal order in which these tasks should be executed. Moreover, the LLM might provide recommendations based on factors like availability, cost, or user preferences. A technical effect of the given autonomous agent comprising the context-builder software module is that the context-builder software module enhances the understanding of the current objective and enables the system to provide more accurate and relevant responses or actions.

Notably, instantiating the at least one communication pattern using the at least one dialogue model related to the objective implies that the at least one dialogue model that is based on a context of the objective is used to the instantiate the at least one communication pattern.

Optionally, the at least one instantiated communication pattern provides at least one feature in the stateful communication, wherein the at least one feature comprises at least one of: a multi-message session, a resumption of dialogues, an enforcement of an intended sequence of messages in the at least one structure of interaction, definition of general communication patterns.

In this regard, the term "feature" as used herein refers to a property or attribute associated with the stateful communication. It will be appreciated that the "at least one feature" refers to "one feature" in some implementations and "a plurality of features" in other implementations. Notably, the at least one instantiated communication pattern providing the at least one feature in the stateful communication implies that the at least one feature is introduced in the stateful communication by instantiating the at least one communication pattern. Throughout the present disclosure, the term "multi-message session" refers to the feature that enables the autonomous agents to send multiple messages, during their stateful communication. Throughout the present disclosure, the term "resumption of dialogues" refers to the feature that enables the autonomous agents to resume their stateful communication from a last message previously sent by the at least one autonomous agent, wherein the stateful communication is asynchronous. Throughout the present disclosure, the term "intended sequence of messages in the at least one structure of interaction" refers to a pre-defined sequence according to which the messages are to be sent or received by the at least one autonomous agent, while interacting according to the at least one structure of interaction for the at least one autonomous agent. Throughout the present disclosure, the term "enforcement of the intended sequence of messages in the at least one structure of interaction" refers to the feature that ensures that the intended sequence of messages is correctly followed in the interaction of the at least one autonomous agent according to the at least one structure of interaction for the at least one autonomous agent. Throughout the present disclosure, the term "definition of general communication patterns" refers to the communication patterns that define abstract rules and logical flow of messages which can be instantiated with a dialogue models associated with the objective of the service request. Different use cases that follow the same structure of interaction but act in different contexts, would use the same communication pattern, instantiated with corresponding dialogue models specifically tailored to their use case, which reduces the complexity of potential interactions, aid in understanding and anticipating information flow as well as categorizing interactions and provide developers with a structured guideline for implementing services or use cases in general. Further, the use of the at least one dialogue model related to the objective to instantiate the at least one communication pattern serves to remove the communication overhead, and to reduce communication capacity requirements, and low memory usage required to achieve the same objective associated with the service request. Optionally, the stateful communication have timeouts, wherein if the stateful communication is not finished within a timeout then the autonomous agents will finish the stateful communication using an automated protocol implicit to every message in the stateful communication. Optionally, the stateful communication for each autonomous agent have a dedicated storage to persist any relevant information needed to resume the stateful communication within originally created context or any information that is stored for a later reference. Optionally, the stateful communication supports concurrency in multiple dialogues taking place parallelly between the autonomous agents. A technical effect of the at least one instantiated communication pattern providing at least one feature in the at least one structure of interaction is that the at least one structure of interaction becomes dynamic and robust, which makes the at least one structure of interaction suitable to be employed for a wide range of scenarios.

Throughout the present disclosure, the term "protocol generator software module" as used herein refers to a software tool that generates the at least one protocol specification for the at least one autonomous agent using the domain-independent protocol specification language. The term "protocol specification" as used herein refers to an implementation of the rules and guidelines that are to be followed for the execution of the one or more tasks associated with the objective for which the protocol specification is generated. Moreover, the at least one protocol specification defines how messages are encoded for a transportation thereof. Optionally, the at least one protocol specification includes constraints or conditions to ensure that a certain message sequence follows a specific pattern. For example, a "SELL" message must follow a "BUY" message, and a "FINISH" message must follow a "START" message. Additionally, such constraints help to maintain the consistency and integrity of the stateful communication of the at least one autonomous agent. Throughout the present disclosure, the term "domain-independent specific language" refers to a formal language that enables the definition of protocols for interactions across the plurality of problem domains. In this regard, the domain-independent protocol specification language is used to describe the format, structure, and rules for communication among the computing nodes. It will be appreciated that the domain-independent protocol specification language provides a standardized way of defining protocols that enables interoperability and seamless communication among the autonomous agents in the distributed computer system, regardless of the domain thereof. Moreover, the domain-independent protocol specification language in the software framework promotes fairness, transparency, and efficiency in the distributed computer system. Furthermore, the domain-independent protocol specification language enables the distributed computer system to become scalable for providing multi-domain services. Optionally each of the at least one protocol specification is identified using manifest (namely, a unique identifier).

Optionally, the domain-independent protocol specification language is stored in a form of a set of instructions, in at least one memory device of the decentralized computing network. Optionally, the at least one memory device may be a physical memory device, such as a hard drive or a flash drive, or a virtual memory device, such as a cloud-based server.

Throughout the present disclosure, the term "given autonomous agent" refers to any particular autonomous agent associated with the objective at a given moment of time. Notably the given autonomous agent in order to implement a given protocol specification for the given autonomous agent, needs to communicate with the computing nodes. Subsequently, the given autonomous agent being configured to communicate with the computing nodes according to the at least one communication pattern ensures that the communication is based on the stateful communication. Notably, implementation of the at least one protocol specification is done by the given autonomous agent, which leads to the execution of each task associated with the objective. Subsequently, the execution of each task associated with the objective, thereby automatically leads to the execution of the service request.

Optionally, the software framework comprises a build executor software module. The term "build executor software module" as used herein refers to a component within the software framework that is specifically designed to handle the composition and execution of tasks within the distributed computer system. The build executor software module is responsible for composing each task associated with the objective in a specific order. Optionally, the build executor software module ensures that the tasks are organized and arranged according to a predefined sequence or priority.

Moreover, the build executor software module also composes each autonomous agent associated with the objective into a further autonomous agent. The further autonomous agent can be understood as a composite autonomous agent that combines the capabilities and functionalities of the individual associated with the objective. Furthermore, to maintain the security and integrity of the distributed computer system, the build executor software module encrypts access to the further autonomous agent. Optionally, by encrypting the access, it ensures that unauthorized entities cannot tamper with or manipulate the further autonomous agent. This security measure safeguards the execution of tasks and protects the distributed computer system from potential threats or unauthorized access. Optionally, the step of encrypting the access to the further autonomous agent need not necessarily be implemented in all embodiments of the present disclosure. In other words, such encryption may be performed only optionally.

The further autonomous agent, which is a composite of the autonomous agent(s) associated with the objective, is configured to implement the at least one protocol specification generated by the distributed computer system. Moreover, the further autonomous agent executes the service request associated with the objective based on the at least one protocol specification. Furthermore, the further autonomous agent automatically executes the service request, carrying out the necessary actions or operations to fulfil the service request.

Optionally, the composability of tasks is how the tasks are combined to fulfil a complex service request. Optionally, the further autonomous agent is a combination of two or more autonomous agents to perform complex action. Optionally, when an existing autonomous agent cannot be used to perform the task associated with the objective associated with the service, a new autonomous agent is created. In the distributed computer system proposed, creation of the new autonomous agent is validated by the Large Language Model (LLM) and/or Machine Learning (ML) models and the autonomous agents communicate within themselves using peer to peer encrypted communication. The at least one autonomous agent participating in execution of tasks associated with the objective of the service request use encryption methods to communicate within themselves and other autonomous agent who are not participating in the tasks of the service request are blocked from communication to prevent any third-party access.

Optionally, the creation of the new autonomous agent is treated as a block of a blockchain network, and after validation by the ML model and/or LLM and/or by existing autonomous agents using association with the task, each new autonomous agent created is appended to the chain of autonomous agents just like new block is connected to the existing blocks of a blockchain. Similar, to the blockchain network, once an autonomous agent has been created after validation, the distributed computer system may have the agent holding the transaction information such as metadata associated with the task. The technical effect of treating the agents as blocks of blockchain is that the proposed system provides a way such that tampering with the functioning of agent can be avoided as it is almost impossible to modify the block once the transaction has been validated. With such a distributed computer system, the service tasks are performed as planned and third-party attacks can be avoided. The new autonomous agents created are cryptographically linked together just like blocks of a blockchain and are immutable, the functioning of the autonomous agents cannot be altered. The distributed computer system provides a secure and transparent way to automatically execute the service request.

The present disclosure also relates to the method as described above. Various embodiments and variants disclosed above, with respect to the aforementioned system, apply mutatis mutandis to the method.

Optionally, executing the step of generating the objective associated with the service request comprises:

- sending the service request to a Large Language Model (LLM) for processing, wherein the Large Language Model (LLM) is configured to transform the service request into a service data associated with the service request, the service data being in a form of one or more vectors recorded in a vector database,
- receiving the service data from the Large Language Model (LLM), and
- using the service data received from the Large Language Model (LLM) as the objective.

Optionally, upon receiving the objective, the method further comprises sending one or more queries to the Large Language Model (LLM) for retrieving one or more tasks associated with the objective of the service request, using a context-builder software module in the given autonomous agent.

Optionally, each of the at least one communication pattern for each autonomous agent amongst the autonomous agents comprises a set of generic states and possible state transitions, wherein each generic state amongst the set of generic states and each possible state transition amongst the possible state transitions have meaningful names and descriptions.

Optionally, the at least one dialogue model is represented as a directed graph (DG), wherein vertices of the directed graph represent possible messages in the at least one dialogue model and edges of the directed graph represent possible replies to a given possible message amongst the possible messages.

Optionally, the method further comprises receiving a list indicative of at least one autonomous agent associated with the objective from the communication framework, wherein the at least one autonomous agent associated with the objective is identified using a broadcast message, wherein the broadcast message comprises a pattern digest broadcasted to the decentralized computing network by the software application and the at least one autonomous agent associated with the objective in the decentralized computing network is identified using the pattern digest.

Optionally, the pattern digest is a cryptographic hash of a type of the at least one communication pattern to be employed for the objective associated with the service request.

Optionally, the at least one instantiated communication pattern provides at least one feature in the stateful communication, wherein the at least one feature comprises at least one of: a multi-message session, a resumption of dialogues, an enforcement of an intended sequence of messages in the at least one structure of interaction, definition of general communication patterns.

The present disclosure also relates to the computer program product as described above. Various embodiments and variants disclosed above, with respect to the aforementioned system and the aforementioned method, apply mutatis mutandis to the computer program product.

DETAILED DESCRIPTION OF THE DRAWINGS

Figure 1B:
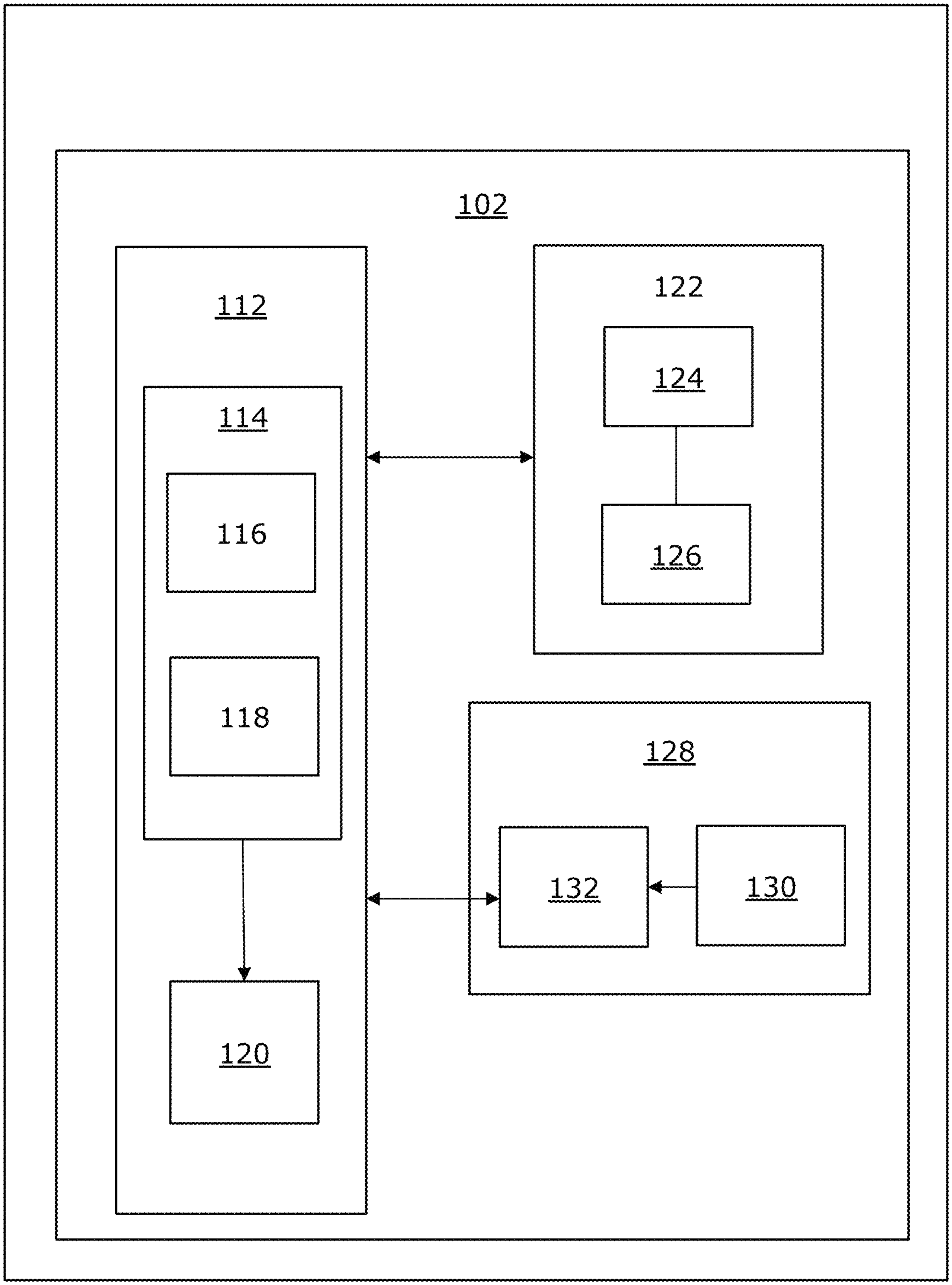
FIG. 1B is an illustration of a block diagram of a software framework implemented by a decentralized computing network of the system, in accordance with an embodiment of the present disclosure.

Referring to FIG. 1A, illustrated is a block diagram of a system 100 for enabling stateful communication among computing nodes, while referring to FIG. 1B illustrated is a block diagram of a software framework 102 implemented by a decentralized computing network 104 of the system 100, in accordance with an embodiment of the present disclosure. Herein, the system 100 comprises the decentralized computing network 104 configured to implement a software framework 102, wherein the decentralized computing network 104 comprises a plurality of computing nodes (depicted as a first computing node 106A and a second computing node 106B) configured to operate as autonomous agents (depicted as a first autonomous agent 108A and a second autonomous agent 108B) which are configured to execute a plurality of modular and extensible software modules (depicted as a first modular and extensible software module 110A and a second modular and extensible software module 110B), wherein the autonomous agents 108A-B are communicably coupled with each other. The software framework 102 comprises a communication framework 112. The communication framework 112 comprises a pattern generation module 114 configured to generate at least one communication pattern (depicted as a communication pattern 116) and at least one dialogue model (depicted as a dialogue model 118) for each autonomous agent; and a pattern instantiation 120 module configured to receive the at least one communication pattern 116 and the at least one dialogue model 118, and instantiate one or more communication patterns upon receiving an instantiation prompt. Moreover, the software framework 102 comprises a software application 122 executed on a client-agent device (for example, in an implementation the first autonomous agent 108A is the client-agent device) configured to generate an objective 124 associated with a service request 126, and to send the objective 124 to the communication framework 112, wherein the objective 124 is the instantiation prompt, wherein the pattern instantiation module 120 is configured to instantiate the at least one communication pattern using the at least one dialogue model 118 related to the objective 124. Furthermore, the software framework 102 comprises a protocol generator software module 128 comprising a domain-independent protocol specification language 130, wherein the protocol generator software module 132 is configured to generate at least one protocol specification 132 for the execution of one or more tasks associated with the objective 124, wherein the at least one protocol specification 132 is generated using the domain-independent protocol specification language 130, wherein a given autonomous agent is configured to communicate with the computing nodes according to the at least one communication pattern 116 that is instantiated by the at least one dialogue model 118 related to the objective, and to implement the at least one protocol specification 132 to execute each task associated with the objective 124, such that the service request 126 is executed.

Figure 2:
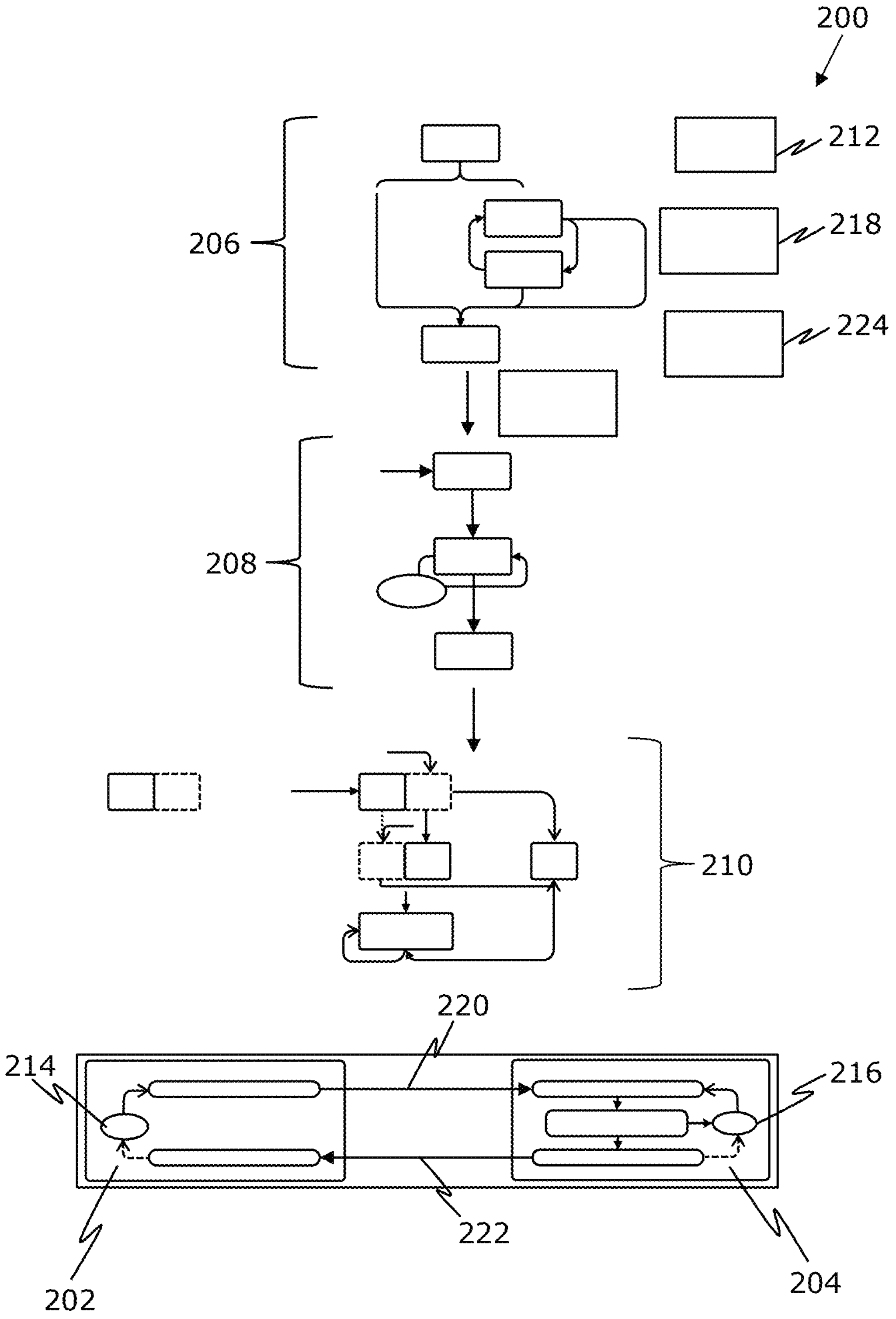
FIG. 2 is a schematic illustration of an exemplary scenario of a communication framework configured to enable stateful communication between a first autonomous agent and a second autonomous agent, in accordance with an embodiment of the present disclosure.

Referring to FIG. 2, illustrated is a schematic illustration of an exemplary scenario of a communication framework 200 configured to enable stateful communication between a first autonomous agent 202 and a second autonomous agent 204, in accordance with an embodiment of the present disclosure. As shown, the communication framework 200 comprises a pattern generation module 206, a pattern instantiation module 208, and a message validation module 210. The pattern generation module 206 generates a communication pattern 212 based on the context of the interaction between the first autonomous agent 202 and the second autonomous agent 204. The pattern instantiation module 208 instantiates the communication pattern 212, with dialogue models 214 and 216, wherein the instantiated communication pattern represents a structure of interaction 218. The message validation module 210 validates messages 220 and 222 to ensure that they conform to the dialogue models 214 and 216, respectively, expected for a current state 224 of the structure of interaction 218. The current state 224 of the structure of interaction 218 represents the current stage of the conversation between the first autonomous agent 202 and the second autonomous agent 204, which determines what messages are valid to send next according to the communication pattern 212. The dialogue models 214 and 216 define the format and content of the messages 220 and 222 exchanged in the structure of interaction 218 to ensure messages are consistent and interpretable by the first autonomous agent 202 and the second autonomous agent 204.

Figure 3:
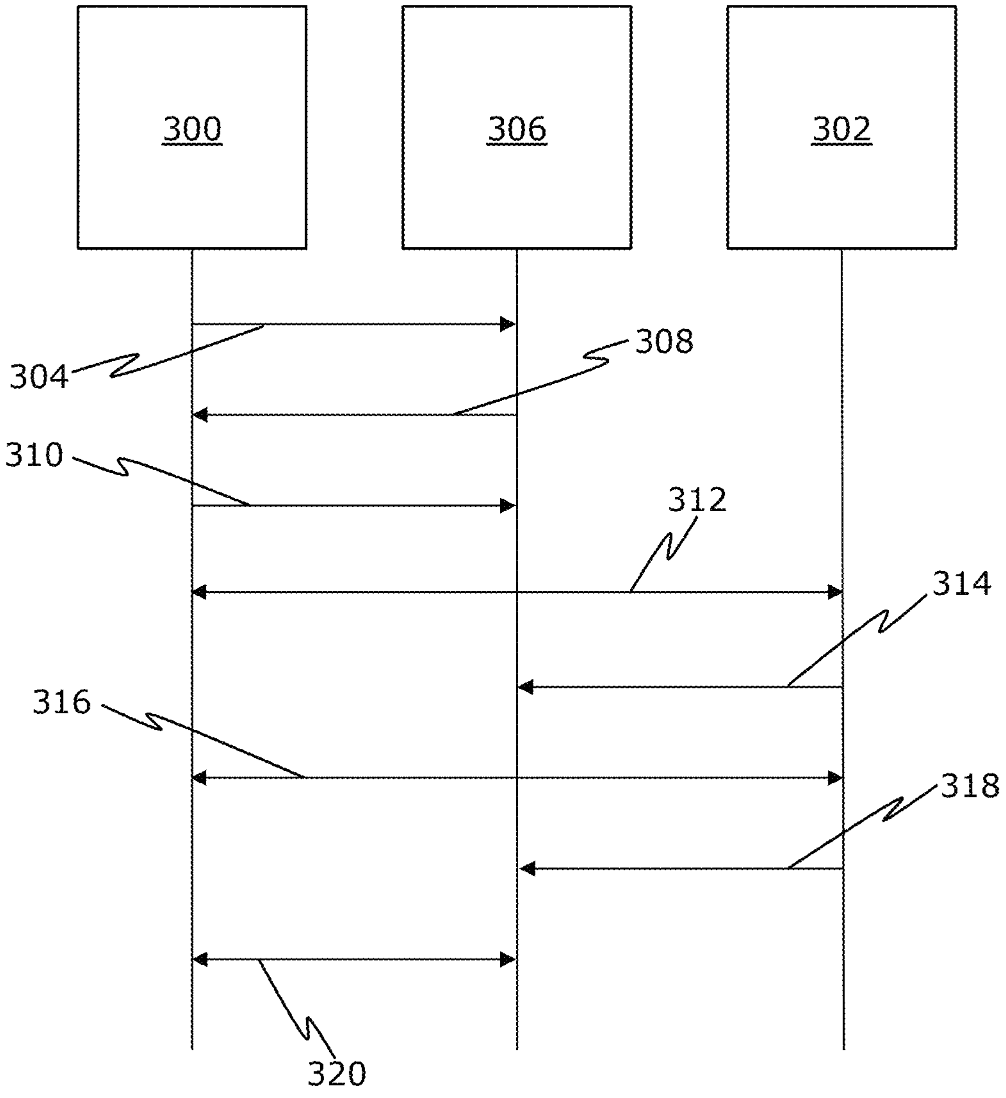
FIG. 3 is an illustration of a flowchart depicting an exemplary scenario of stateful communication between a client-agent device and a given autonomous agent, in accordance with an embodiment of the present disclosure.

Referring to FIG. 3, illustrated is a flowchart depicting an exemplary scenario of stateful communication between a client-agent device 300 and a given autonomous agent 302, in accordance with an embodiment of the present disclosure. As shown, at step 304, a communication framework 306 receives an objective associated with a service request from the client-agent device 300. At step 308, the communication framework 306 provides a list of at least one autonomous agent associated with the objective to the client-agent device 300. At step 310, the given autonomous agent 302 is selected by the client-agent device 300 to interact with. At step 312, the communication framework 306 enables the stateful communication between the client-agent device 300 and the given autonomous agent 302. At step 314, the given autonomous agent 302 accepts a request from the communication framework 306. At step 316, the communication framework enables the stateful communication between the client-agent device 300 and the given autonomous agent 302. At step 318, the request is concluded by the given autonomous agent 302. At step 320, the client-agent device 300 continues the communication with the communication framework 306.

Figure 4A:
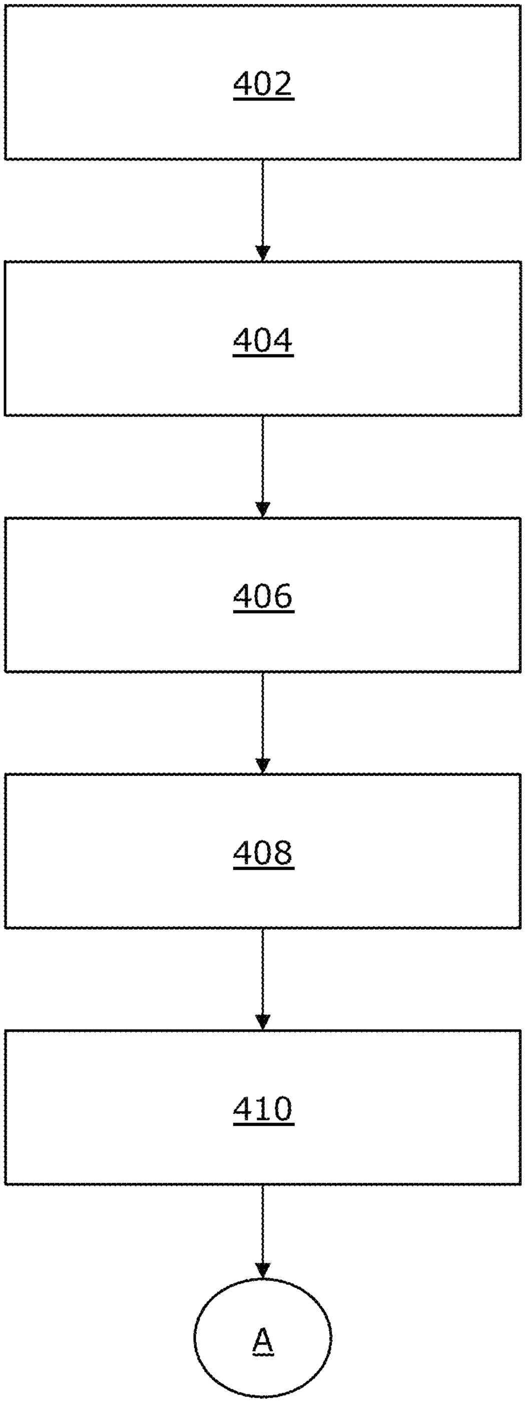
FIGS. 4A and 4B collectively are an illustration of a flowchart depicting steps of a method for enabling stateful communication among computing nodes, in accordance with an embodiment of the present disclosure.
Figure 4B:
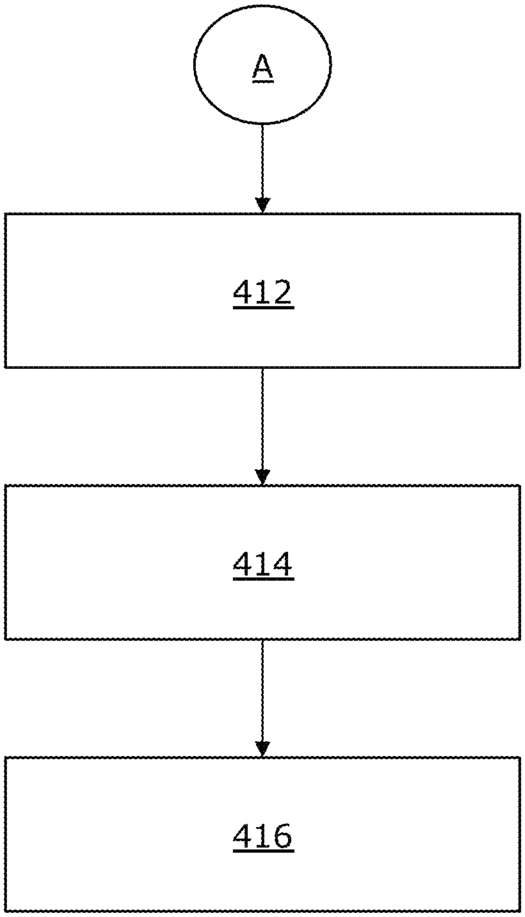

Referring to FIGS. 4A and 4B collectively, illustrated are a flowchart depicting steps of a method for enabling application of autonomous agents based on stateful communication. At step 402, a software framework is implemented, via a decentralized computing network, wherein the decentralized computing network comprises a plurality of computing nodes configured to operate as autonomous agents (AAs), which are configured to execute a plurality of modular and extensible software modules, wherein the autonomous agents are communicably coupled with each other. At step 404, at least one communication pattern and at least one dialogue model are generated for each autonomous agent using a pattern generation module of a communication framework of the software framework. At step 406, the at least one communication pattern and the at least one dialogue model are received at a pattern instantiation module of the communication framework of the software framework. At step 408, one or more communication patterns are instantiated upon receiving an instantiation prompt, using the pattern instantiation module. At step 410, an objective associated with a service request is generated, using a software application executed on a client-agent device, and the objective is sent from the software application to the communication framework, wherein the objective is the instantiation prompt, for instantiating the at least one communication pattern using the at least one dialogue model related to the objective. At step 412, at least one protocol specification is generated for the execution of one or more tasks associated with the objective, wherein the at least one protocol specification is generated using a domain-independent protocol specification language in the protocol generator software module. At step 414, communication of a given autonomous agent is enabled with the computing nodes according to the at least one communication pattern that is instantiated, by the at least one dialogue model related to the objective. At step 416, the at least one protocol specification is implemented for executing each task associated with the objective, such that the service request is executed.

The steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

Annexture

1. Hereinbelow, there is provided an example code of how autonomous agents are enabled to send messages while communicating.

```
async def send_message(ctx: Context):
    msg = f"Hello there {bob.name} my name is {alice.name}."
    await ctx.send(bob.address, Message(text=msg))
```

2. Hereinbelow, there is provided an example code of how a message is broadcasted to a protocol.

```
async def say_hello(ctx: Context):
    await ctx.broadcast(proto.digest,
message=BroadcastExampleRequest( ))
```

3. Hereinbelow, there is provided an example code of an on_message decorator.

```
@user.on_message(QueryTableResponse,
replies={BookTableRequest})
async def handle_query_response(ctx: Context, sender: str, msg:
QueryTableResponse):
```

4. Hereinbelow, there is provided an example code of a definition of a pattern.

```
#Node definition for the dialogue states
chatting_state = Node(
    name="Chit Chatting",
    description="While in this state, more messages can be exchanged.",
)
end_state = Node(
    name="Concluded",
    description="This is the state after the dialogue has been concluded
and "
    "no more messages will be accepted.",
)
```

Edge Definition for the Dialogue Transitions

```
start_dialogue = Edge(
    name="Start Dialogue",
    description=(
        "A message that initiates a ChitChat conversation and provides "
        "any information needed to set the context and let the receiver "
        "decide whether to accept or directly end this conversation."
    ),
    parent=None,
    child=chatting_state,
)
cont_dialogue = Edge(
    name="Continue Dialogue",
    description=(
        "A general message structure to exchange information without "
        "annotating further states or limiting the message flow in any
way."
    ),
    parent=chatting_state,
    child=chatting_state,
)
end_dialogue = Edge(
    name="End Dialogue",
    description=(
```

-continued

```
        "A final message that can be sent at any time by either party "
        "to finish this dialogue."
    ),
    parent=chatting_state,
    child=end_state,
)
```

4. Hereinbelow, there is provided an example code of creating an abstract pattern and defining message handlers corresponding to edges of the graph.

```
class SimpleChitChatDialogue(Dialogue):
    ...
    def on_start_dialogue(self, model: Type[Model]):
        """
        This handler is triggered when the initial message of the
        dialogue is received.
        It automatically transitions into the chit-chatting state for
        the next message exchange or directly into the end state.
        """
        return super( )._on_state_transition(start_dialogue.name, model)
    def on_continue_dialogue(self, model: Type[Model]):
        ...
    def on_end_session(self, model: Type[Model]):
        ...
```

5. Hereinbelow, there is provided an example code of actual instantiation of a communication pattern with a dialogue model.

```
# define dialogue messages; each transition needs a separate message
class InitiateChitChatDialogue(Model):
    pass
class ChitChatDialogueMessage(Model):
    text: str
class ConcludeChitChatDialogue(Model):
    pass
# instantiate the dialogues
chitchat_dialogue = SimpleChitChatDialogue(
    version="0.1",
    agent_address=agent.address,
)
# specify with which particular message this agents fills the pattern
@chitchat_dialogue.on_initiate_session(InitiateChitChatDialogue)
async def start_chitchat(
    ctx: Context,
    sender: str,
    _msg: InitiateChitChatDialogue,
):
    # do something when the dialogue is initiated
await ctx.send(sender, ChitChatDialogueMessage(text="Wasssuuup!"))
...
```

6. Hereinbelow, there is provided an example code of how to access a history of messages in a session of an autonomous agent.

```
@chitchat_dialogue.on_end_session(ConcludeChitChatDialogue)
async def conclude_chitchat(
    ctx: Context,
    sender: str,
    _msg: ConcludeChitChatDialogue,
):
    # do something when the dialogue is concluded after messages have
been exchanged
    ctx.logger.info(ctx.dialogue)
```

7. Hereinbelow, there is provided an example code of state transition descriptors of at least one dialogue model.

```
@dialogue.on__state__transition(init__state, InitMessage)
def handle__init(
ctx: Context,
sender: str,
__msg: InitMessage):
  ...
@dialogue.on__state__transition(next__state, NextMessage)
def handle__init(
ctx: Context,
sender: str,
__msg: NextMessage):
  ...
@dialogue.on__init__state(InitMessage)
def handle__init(
ctx: Context,
sender: str,
__msg: InitMessage):
  ...
@dialogue.on__next__state(NextMessage)
def handle__init(
ctx: Context,
sender: str,
__msg: NextMessage):
  ...
```

8. Hereinbelow, there is provided an example code of evaluating the need of adjustment of envelope and dialogue identification.

```
version: int
sender: str
target: str
session: UUID4
schema__digest: str = Field(alias="protocol") # why the alias? isn't that
wrong?
protocol__digest: Optional[str] = None
payload: Optional[str] = None
expires: Optional[int] = None
nonce: Optional[int] = None
signature: Optional[str] = None
```

9. Hereinbelow, there is provided an example code of creating a manifest for a protocol specification.

```
protocol__manifest = {
  version: str = "1.0",
  metadata: dict = {
      "name": "<protocol__name>",
      "version": "1.0",
      "digest": "proto:...",
    },
  models: List[Dict[str, Any]] = {
      {"digest": schema__digest, "schema":
model.schema( )},
      ...
    }, # all models in the protocol
  interactions: List[Dict[str, Any]] = {
      {
  "type": "query" # or "normal"
  "request": request,
  "responses": list(responses.keys( )),
    }, ...
    } # each interaction (model -> reply), populated through
on__message handler
}
```

10. Hereinbelow, there is provided an example code of creating a manifest for a communication pattern.

```
dialogue__manifest = {
  version: str = "1.0",
  metadata: dict = {
      "name": "<protocol__name>",
      "version": "1.0",
      "digest": "dialogue:...",
    },
  nodes: List[Dict[str, Any]] = {
      {"digest": node__digest, "schema": model.schema( )},
      ...
    },
  edges: List[Dict[str, Any]] = {
      {
        "digest": edge__digest, "schema":
model.schema( )
      } # the schema includes name, description, parent &
child
    },
  models = {
      ...
    }, # these models could also be put in the edges param
}
```

11. Hereinbelow, there is provided an example code of creating a common manifest structure for a protocol specification and a communication pattern.

```
interactions: List[Dict[str, Any]] = {
      {
  "type": "rule" # NEW
  "request": request,
  "responses": list(responses.keys( )),
  }, ...
```

12. Hereinbelow, there is provided an example code of a ResourceRequestDialogue communication pattern instantiated with a FlightRequestDialogue dialogue model.

```
class FlightQuery(Model):
    # instantiates ResourceQuery
    from__: str = Field(alias="from", description="This field is the
airport IATA code for of the airport from where the user wants to fly
from. This should be airport IATA code. IATA airport code is a three-
character alphanumeric geocode.")
  to: str = Field(description="This field is the airport IATA code of the
destination airport! This should be airport IATA code. IATA airport code
is a three-character alphanumeric geocode.")
  trip: Optional[str] = Field(description="This can be oneway or return")
  date: str = Field(description="Contains the date of flying out.")
  back__date: Optional[str] = Field(description="Optional field only for
return flight. This is the date when the user wants to fly back")
  route: Optional[int] = Field(description="Selects the maximum
number of stops, 0 means direct flight, 1 means with maximum 1
stop.")
  persons: int = Field(description="Describes how many persons are
going to fly.")
class FlightAvailability(Model):
    # instantiates ResourceAvailability
    carrier: str
    duration:
    departure:
    arrival:
    price:
    id:
...
```

13. Hereinbelow, there is provided an example sequence diagram of stateful communication between an autonomous agent A and another autonomous agent B.

```
participant A as AI Engine
participant B as FlightAgent
A->>B: FlightQuery
B->>B: reserve resource
B-->>A: FlightAvailability
alt take flight
  A->>B: FlightReservation
  B-->>A: FlightReservationConfirmation
else reject flight
  A->>B: FlightRejection
  B-->>A: FlightRejectionConfirmation
  B->>B: release resource
else timeout
  B->>B: release resource
  B->>A: TimeoutMsg
end
```

The invention claimed is:

1. A distributed computer system for enabling stateful communication among computing nodes, the system comprising:

a decentralized computing network configured to implement a software framework, wherein the decentralized computing network comprises a plurality of computing nodes, wherein each of the plurality of computing nodes comprises at least one processor, at least one memory device, and a communication interface, wherein the plurality of computing nodes is configured to operate as autonomous agents (AAs), which are configured to execute a plurality of modular and extensible software modules, wherein at least one computing node is a client agent device, wherein the autonomous agents are communicably coupled with each other, and wherein the software framework comprises:

a communication framework, a software application executed on the client agent device configured to generate an objective associated with a service request, and configured to send the objective to the communication framework, wherein the communication framework comprises:

a pattern generation module configured to generate at least one communication pattern and at least one dialogue model associated with the objective for each autonomous agent; and a pattern instantiation module configured to:

receive, from the pattern generation module, the generated at least one communication pattern and the at least one dialogue model, and instantiate the at least one communication pattern using the at least one dialogue model related to the objective upon receiving an instantiation prompt, wherein the objective is the instantiation prompt and wherein the instantiation prompt indicates to the software framework at least one of the autonomous agents to be used to execute one or more tasks associated with the objective of the service request, wherein the software application is further configured to:

use a Large Language Model (LLM) to transform the service request into service data, use the service data as the objective; and a protocol generator software module configured to generate at least one protocol specification for execution of the one or more tasks associated with the service data, wherein the at least one protocol specification is generated using a domain-independent protocol specification language, wherein the at least one of the autonomous agents is configured to:

execute a protocol-defined message flow according to the instantiated communication pattern and the at least one dialogue model related to the objective, execute, using the at least one protocol specification, message exchanges and operations defined for each task associated with the objective, and automatically update protocol state information required for stateful communication in accordance with the semantically-typed state transitions during execution of each task associated with the objective.

2. The system of claim 1, wherein the at least one of the autonomous agents comprise a context-builder software module configured to, upon receiving the objective, query the Large Language Model (LLM) to retrieve one or more tasks associated with the objective.

3. The system of claim 1, wherein each communication pattern for an autonomous agent comprises a set of generic states and a set of possible state transitions, each generic state and each state transition having a meaningful name and description.

4. The system of claim 1, wherein the at least one dialogue model is represented as a directed graph (DG), wherein vertices of the directed graph represent possible messages and edges of the directed graph represent possible replies.

5. The system of claim 1, wherein the protocol generator software module is configured to receive, from the communication framework, a list identifying the autonomous agents associated with the objective, the identification being based on a broadcast message comprising a pattern digest transmitted by the software application.

6. The system of claim 5, wherein the pattern digest is a cryptographic hash of a type of the at least one communication pattern to be employed for the objective associated with the service request.

7. The system of claim 1, wherein the service data generated by the Large Language Model (LLM) comprises one or more vectors, and wherein the one or more vectors are recorded in a vector database.

8. The system of claim 1, wherein the instantiated communication pattern provides at least one feature in the stateful communication, the at least one feature comprising at least one of: a multi-message session, a resumption of dialogues, an enforcement of an intended sequence of messages, or a definition of general communication patterns.

9. A method for enabling stateful communication among computing nodes, the method comprising:

via a decentralized computing network configured to implement a software framework, wherein the decentralized computing network comprises a plurality of computing nodes, wherein each of the plurality of computing nodes comprises at least one processor, at least one memory device, and a communication interface, and wherein the plurality of computing nodes is configured to operate as autonomous agents (AAs), which are configured to execute a plurality of modular and extensible software modules and are communicably coupled with each other, wherein at least one computing node is a client agent device, wherein the software framework comprises a communication framework;

generating, using a software application executed on the client-agent device, an objective associated with a service request and sending the objective from the software application to the communication framework;

generating at least one communication pattern and at least one dialogue model associated with the objective for each autonomous agent, using a pattern generation module of the communication framework;

receiving, from the pattern generation module, the generated at least one communication pattern and the at least one dialogue model at a pattern instantiation module of the communication framework;

instantiating the at least one communication pattern using the at least one dialogue model related to the objective upon receiving an instantiation prompt, wherein the objective is the instantiation prompt and wherein the instantiation prompt indicates at least one of the autonomous agents to be used to execute one or more tasks associated with the objective of the service request;

using a Large Language Model (LLM) to transform the service request into service data, and using the service data as the objective;

generating at least one protocol specification for the execution of the one or more tasks associated with the service data received from LLM as the objective, wherein the at least one protocol specification is generated using a domain-independent protocol specification language in a protocol generator software module;

executing, by the at least one of the autonomous agents, a protocol-defined message flow according to the instantiated communication pattern and the at least one dialogue model related to the objective;

executing, using the at least one protocol specification, message exchanges and operations defined for each task associated with the objective; and automatically updating protocol state information required for stateful communication in accordance with the semantically-typed state transitions during execution of each task associated with the objective.

10. The method of claim 9, wherein upon receiving the objective, the method further comprises querying the Large Language Model (LLM), using a context-builder software module of the at least one of the autonomous agents, to retrieve one or more tasks associated with the objective.

11. The method of claim 9, wherein each communication pattern for an autonomous agent comprises a set of generic states and a set of possible state transitions, each generic state and each state transition having a meaningful name and description.

12. The method of claim 9, wherein the at least one dialogue model is represented as a directed graph (DG), wherein vertices of the directed graph represent possible messages and edges of the directed graph represent possible replies.

13. The method of claim 9 further comprising receiving, at the protocol generator, a list identifying the autonomous agents associated with the objective, the identification being based on a broadcast message comprising a pattern digest transmitted by the software application.

14. The method of claim 13, wherein the pattern digest is a cryptographic hash of a type of the at least one communication pattern to be employed for the objective associated with the service request.

15. The method of claim 9, wherein the instantiated communication pattern provides at least one feature in the stateful communication, the at least one feature comprising at least one of: a multi-message session, a resumption of dialogues, an enforcement of an intended sequence of messages, or a definition of general communication patterns.

16. A computer program product comprising a non-transitory machine-readable data storage medium having stored thereon program instructions that, when executed by a processing device, cause the processing device to perform the method of claim 9.

* * * * *